United States Patent [19]

Salviati

[11] 4,272,894
[45] Jun. 16, 1981

[54] DRYING STEP IN A METHOD OF PRODUCING CERAMIC ARTICLES

[75] Inventor: Antonio Salviati, Vicenza, Italy

[73] Assignee: Salviati Impianti S.p.A., Vicenza, Italy

[21] Appl. No.: 22,464

[22] Filed: Mar. 21, 1979

[51] Int. Cl.³ .............................................. F26B 3/04
[52] U.S. Cl. ............................................. 34/9; 34/26; 34/28; 34/46; 34/50; 264/64; 264/234; 34/68
[58] Field of Search .................. 34/28, 26, 31, 50, 46, 34/17, 68, 9; 264/64, 234, 82, 344, 345, 39; 432/258, 259

[56] References Cited

U.S. PATENT DOCUMENTS

| | | | |
|---|---|---|---|
| 1,567,023 | 12/1925 | Larsson | 34/28 |
| 1,917,039 | 7/1933 | Klein et al. | 264/39 |
| 2,089,399 | 8/1937 | Monnier | 34/227 |
| 2,632,088 | 3/1953 | Meyrick et al. | 264/39 |

Primary Examiner—Larry I. Schwartz
Attorney, Agent, or Firm—Birch, Stewart, Kolasch & Birch

[57] ABSTRACT

A method of drying green ceramic articles with a hot air stream in a drier, wherein the green articles, immediately or soon after entering the drier, are heated to 100° C. while the moisture content thereof is maintained equal to that of the green articles at the beginning of heating step.

5 Claims, No Drawings

DRYING STEP IN A METHOD OF PRODUCING CERAMIC ARTICLES

BACKGROUND OF THE INVENTION

The present invention relates to an improvement to the drying step utilized in a method for producing ceramic articles, earthenware, bricks or the like, wherein the drying is achieved by means of a stream of hot air in a continuous tunnel drier or in a static drier.

The term "hot air" used in the rest of this description and in the claims refers to the medium for drying the ceramic articles. The medium can be preheated air, hot gases, hot combustion vapours or the like.

A method for producing ceramic articles, such as earthenware, bricks or the like, substantially comprises the following steps in succession: moulding the clay material, drying the moulded articles and firing the articles after drying.

The clay is moulded in conventional devices, e.g. presses or extruders, by a "wet" method using vapour if required, or by a dry method wherein clay is moulded using the moisture in the material itself, combined with adequate moulding pressure. The ceramic articles, irrespective of the manner in which they have been moulded, must be dried for a suitable period in order to eliminate most of the water mixed therewith or hygroscopically absorbed therein. This operation is necessary to ensure that the green articles become sufficiently compact and strong to withstand the subsequent manipulation and loading into the furnaces without being deformed and without cracking, shrinking or breaking, which they would tend to do if the water was removed too quickly from the green ceramic articles, i.e. if they were placed in the furnaces immediately after being moulded.

The ceramic articles can be dried naturally or artificially. Natural drying, brought about simply by the atmospheric air around the ceramic articles, is not desirable due to the high cost of storing and taking out the articles and the fact that the production of finished articles is dependent on the weather. Artificial drying is brought about in static chamber driers or, more commonly, in tunnel driers. The medium used for drying the ceramic articles in the desired manner is a stream of hot air, generally circulated in counter-current relationship with the articles.

The prior-art drying of ceramic articles has technical and economic disadvantages which have not heretofore been overcome. In order to produce the desired heat-exchange conditions and remove the boundary layer of vapour surrounding the ceramic articles, a considerable amount of air has to be conveyed inside the drier, and the hot drying air has to move at high speed. This results in considerable energy consumption required in driving the fans outside or inside the drier, in order to ensure the required flow rate of the hot drying air.

Furthermore, the temperature difference between the hot drying air and the ceramic articles to be dried is still rather small. The reasons are as follows:

(1) The temperature of the ceramic articles entering the drier is relatively low.

(2) The heat exchange between hot air and the articles to be dried occurs in counter-current relationship, and (3) At the end of the drying process the articles can withstand only a small amount of surface heating, since they are in the phase during which water is diffusing in vapour form into a porous material and the volume of vapour is about $10^3$ times the volume of liquid water. Consequently, the ceramic articles will burst if they are surface-heated above a predetermined maximum value.

However, drying is mainly due to heat exchange by forced convection, the maximum exchange being dependent on the speed and amount of hot air being circulated.

Another technical disadvantage is that, at the temperature of the ceramic entering the drier (25°–40° C.), the water in the form of moisture in the green ceramic articles is very viscous and there is a high bonding force between the water and the clay constituting the ceramic articles. As a result, the surface of the articles is dried and shrinks, whereas the interior remains moist. The difference between the interior and the shrinking exterior of each ceramic article produces high tensions in the clay and may result in permanent deformation, microscropic cracking or breakage of the ceramic articles. The danger of micro-cracking is increased by the phenomenon known as thermo-osmosis, consisting mainly of migration of liquid water from the hot surface to an internal, colder region of each ceramic article being dried.

The invention is based on the problem of providing a method of producing ceramic articles, earthenware, bricks and the like, wherein the step of drying the articles is carried out so as to simultaneously to obviate all of the disadvantages of the prior art, so that the ceramic articles can be dried in much shorter times than those at presently required in corresponding known methods.

SUMMARY OF THE INVENTION

To this end, according to the present invention, the ceramic articles, immediately or soon after entering the drier, are heated to temperatures which can reach also 100° C. and, during the heating, the moisture content of the ceramic articles remains substantially equal to the moisture content of the articles at the beginning of the heating process.

In a preferred embodiment of the invention, the ceramic articles are heated to a temperature between 40° and 100° C. (the dew point) in an environment at a high partial water pressure.

More particularly, the ceramic articles are heated to a temperature between 40° and 100° C. (the dew point) by a stream of hot air at a temperature of 120° to 400° C., having a moisture content between 48 and 850 g per kg dry air.

In the case where the ceramic articles are dried in a tunnel drier, according to another feature of the present invention, the articles are heated within the aforementioned temperature range by the aforementioned stream of hot air, which is supplied to the drier in co-current relationship with the ceramic articles.

When the ceramic articles are heated in an environment at a high partial pressure of water vapour, the result, due to the known cold-wall effect, is that the water vapour condenses on the surface of earth article, thus giving up heat of condensation which uniformly heats the ceramic article over its entire surface and inside, before the water begins to evaporate from the surface of the article. The reason is that, during the first step of the method, the flow of heat entering the article is greater than the flow of heat leaving it, and this increases the temperature of the article. This is due to the high partial pressure of water and the consequent high coefficient of heat exchange at the place where heating occurs. The exchange coefficient is 10 to 100 times greater than in conventional hot-air driers.

During the process of drying the ceramic articles, control of the partial water pressure and temperature control are fundamental factors in balancing the flow of heat entering each ceramic article with the flow of water or vapour leaving it, which are dependent upon the various drying steps or on the characteristics of the ceramic article, e.g. its porosity, shape, thickness or mechanical strength. According to the present invention, the aforementioned control is brought about not only by varying the amount of air or fuel burnt inside or outside the drier and/or by recycling the exhaust vapours from the drier but more particularly by injecting vapour and/or water, atomized if necessary, into the drier in order to obtain the aforementioned desired temperature and humidity conditions of the drying air.

In static driers, the aforementioned controls are brought about by injecting vapour and/or finely atomized water into the combustion products in an appropriate fuel burner. In continuous tunnerl driers, the vapour or atomized water is injected only during the starting phase of the drier, whereas during normal operation some of the hot air or vapours discharged from the drier may advantageously be recycled, after reheating if necessary, thus greatly reducing the energy consumption.

According to another embodiment of the present invention, the ceramic articles are heated to between 40° and 100° C. by conveying the articles through a bath of water maintained at the desired temperature.

Because of the aforementioned heating, the ceramic articles during the actual drying step are in conditions such that there is:

A considerable reduction in the bonding forces between the water and the clay, a decrease in the viscosity of the water, and an increase in and balancing of the diffusivity of water through the ceramic article.

The results, during drying, are:

More uniform shrinkage of each ceramic article until all the water has been lost, and a considerable reduction in tension inside each ceramic article, so that the tension can be reduced below the limit where breaking or permanent deformation occurs, thus eliminating the risk of deformation, microscopic cracks, fracture and the like.

Another advantage is that ceramic articles under the aforementioned conditions are dried in a hot air or gas environment at a controlled temperature and a controlled humidity, i.e. a controlled partial pressure of water. In the case where a tunnel drier is used, the air is driven in co-current relationship with the ceramic articles. Due to these associated conditions, drying can be brought about by a heat exchange based mainly on the temperature difference between the ceramic articles and the hot air, instead of heat exchange through forced convection. The temperature difference can be adequately increased, particularly at the beginning of the drying process, since the ceramic articles are heated up to 100° C. and can undergo greater surface heating than the very small amount utilized in known drying processes, without any risk of exploding as a result of vapour spreading inside each ceramic article. The reason is that water flows in liquid form to the surface of the article, where it evaporates.

Another result of the aforementioned associated conditions of each ceramic article, which is heated to a temperature up to 100° C., and of the co-current flow of the hot, moist drying air and the control of the temperature and humidity of the air, is that the ceramic articles can be completely dried in much shorter times (reduced by a factor of 10 to 100) than the times required by the known methods.

DESCRIPTION OF A PREFERRED EMBODIMENT

The following are some non-limitative examples of drying ceramic articles according to the present invention.

EXAMPLE 1

100 ceramic articles were inserted in a tunnel drier, after being piled in conventional manner on a trolley which was guided through the drier. The ceramic articles had been moulded by the dry moulding method, and had been taken out of a warehouse.

The ceramic articles were made of clay having substantially the following composition:
$SiO_2$:45%; $Al_2O_3$:40%; $Fe_2O_3$:2%; MO:1%; CaO:10%; $Na_2O$:2%.

The average water content of each ceramic article was 8% when it was taken out of the warehouse.

Immediately after entering the drier, the ceramic material travelled through a region at a temperature of 200° C., supplied with hot, moist air containing 800 g water per kg dry air.

The hot air was supplied in co-current relationship with the ceramic articles at a flow rate of 10 $m^3$/min.

The ceramic material was completely dried in 400 seconds.

The drying air was discharged from the drier at a temperature of 110° C. Some was discharged, whereas some was reheated to 200° C. and sent into the drier co-current with additional ceramic articles. Each ceramic article coming out of the drier had an average temperature of 80° C. and a residual water content of 0.8%. Under these conditions, it was directly supplied to a conventional furnace. Out of 100 ceramic articles subjected to the aforementioned drying step, no defects were found due to cracking, breaking or deformation.

EXAMPLE 2

100 ceramic articles were introduced into a continuous tunnel drier in the manner described in Example 1. The ceramic articles had been moulded by the conventional wet method, e.g. using an extruder and vapour. The ceramic articles were made of clay having substantially the same composition as the clay in Example 1. The average water content of each ceramic article was 25% when taken from a warehouse.

Immediately after entering the drier, the ceramic material travelled through the first heated region in a stream of hot moist air at 250° C. and containing 800 g water per kg dry air. The air was supplied in co-current with the ceramic articles.

On leaving the heated region, each ceramic article was at 80° C. and had substantially the same moisture content (25%) as when it entered the heated region. Under the aforementioned temperature and moisture conditions, the ceramic articles travelled through the tunnel drier in a stream of hot, moist air supplied in co-current at a flow rate of 10 $m^3$/min and at a temperature slightly below 250° C.

The ceramic articles were completely dry in 900 seconds.

Some of the air discharged from the drier at 110° C. was heated to 250° C. and recycled to the drier inlet. The ceramic articles coming from the tunnel drier had an average temperature of about 90° C. and a residual water content of 0.8%. In this state, they were directly supplied to a conventional furnace.

Out of 100 ceramic articles processed in the aforementioned manner, no defects were found due to cracking, breaking or deformation.

EXAMPLE 3

100 ceramic articles were supplied to a continuous tunnel drier in the manner described in Example 2. The average water content of each ceramic article was 25%.

Immediately after entering the drier, the ceramic articles travelled through a water bath kept at boiling-point. On coming out of the bath, each ceramic article was at a temperature slightly below 100° C. and had substantially the same moisture content (25%) as before entering the bath. Under the aforementioned temperature and moisture conditions, the ceramic articles made contact with a stream of hot air containing 400 g $H_2O$ per kg dry air supplied in co-current with the articles at a temperature of 350° C. and at a flow rate of 10 $m^3$/minute.

The ceramic material was completely dry in 900 seconds.

Some of the hot, moist air discharged from the drier at approx. 150° C. was reheated to 350° C. and recycled to the drier inlet. The ceramic articles leaving the drier had an average temperature of about 90° C. and a residual water content of 0.8°. In this state, they were directly supplied to a conventional furnace.

At the end of this drying operation likewise, 100 processed ceramic articles did not show any defects due to cracking, breaking or deformation.

EXAMPLE 4

100 ceramic articles moulded by the wet method were placed in a chamber drier (i.e. a static drier). The articles had a moisture content of about 25%. The chamber drier was closed, after which vapour at 200° C. was introduced therein, the vapour containing 800 g water per kg dry vapour.

The flow rate of vapour was 5 $m^3$/minute. The vapour was obtained by injecting finely atomized water into the combustion products of a burner until the aforementioned moisture content was obtained.

The ceramic articles were completely dry in 900 seconds.

The exhaust vapours discharged from the drier were at 120° C.

On being discharged from the drier, the ceramic articles were at 80° C. and had a residual water content of 0.8%. In this state, they were directly supplied to a conventional furnace.

100 ceramic articles were processed but did not show any defects due to micro-cracking, breaking or deformation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of drying green ceramic articles in a continuous tunnel drier comprising the steps of
    introducing the green ceramic articles into the tunnel drier,
    conveying the ceramic articles through a water bath where they are heated to a temperature of 40° to 100°,
    removing the ceramic articles from the water bath,
    heating the green ceramic articles in the drier to a drying temperature while maintaining them at a moisture content substantially equal to that existing at the beginning of the heating steps; and
    drying the green articles previously heated;
    said heating and drying steps being carried out by passing a stream of hot air in co-current relationship with the green ceramic articles entering the tunnel drier, said stream of hot air having a temperature of from 120° to 140° C. and a moisture content of from 48 to 850 g of water per kg of dry air.

2. The method of claim 1 wherein the ceramic articles are heated to a temperature of 40° to 100° C. by said stream of hot air.

3. The method of claim 1 wherein the stream of hot air at least partially includes exhaust air which has been discharged from the drier, heated and recycled to the drier inlet.

4. The method of claim 1 wherein the temperature and humidity control of the drying air is facilitated by injecting water vapor and/or atomized water into the drier.

5. The method of claim 1 wherein the hot air was supplied at a flow rate of about 10 $m^3$/min.